(12) United States Patent
Mombelli et al.

(10) Patent No.: US 9,993,905 B2
(45) Date of Patent: Jun. 12, 2018

(54) APPARATUS AND METHOD FOR POLISHING CAVITIES IN MECHANICAL COMPONENTS

(75) Inventors: Filippo Giacomo Mombelli, Vaiano Cremasco (IT); Andrea Marco Arnello, Cosseria (IT)

(73) Assignees: LUBEN GLASS S.R.L., Offanengo (CR) (IT); ARNMEC S.R.L., Cosseria (SV) (IT)

( * ) Notice: Subject to any disclaimer, the term of this patent is extended or adjusted under 35 U.S.C. 154(b) by 512 days.

(21) Appl. No.: 13/261,081

(22) PCT Filed: Jan. 13, 2010

(86) PCT No.: PCT/EP2010/050328
§ 371 (c)(1),
(2), (4) Date: Dec. 12, 2011

(87) PCT Pub. No.: WO2010/145852
PCT Pub. Date: Dec. 23, 2010

(65) Prior Publication Data
US 2012/0100782 A1    Apr. 26, 2012

(30) Foreign Application Priority Data

Jun. 19, 2009   (IT) ............................. MI2009A1089

(51) Int. Cl.
*B24B 31/06* (2006.01)
*B24B 57/02* (2006.01)
(Continued)

(52) U.S. Cl.
CPC .......... *B24B 31/064* (2013.01); *B24B 31/006* (2013.01); *B24B 31/06* (2013.01); *B24B 57/02* (2013.01); *B24B 57/04* (2013.01)

(58) Field of Classification Search
CPC ..... B24B 31/006; B24B 31/06; B24B 31/064; B24B 57/02; B24B 57/04
(Continued)

(56) References Cited

U.S. PATENT DOCUMENTS

| 2,353,492 A | 7/1944 | O'Connor |
| 2,804,724 A * | 9/1957 | Thatcher ......................... 451/36 |

(Continued)

FOREIGN PATENT DOCUMENTS

| DE | 77 24 441 | 11/1977 |
| WO | WO 00/32354 | 6/2000 |
| WO | WO 00/32355 | 6/2000 |

OTHER PUBLICATIONS

International Search Report dated Feb. 17, 2010.

*Primary Examiner* — Eileen Morgan
(74) *Attorney, Agent, or Firm* — Hedman & Costigan, P.C.; James V. Costigan; Kathleen A. Costigan

(57) ABSTRACT

An apparatus (1) for polishing cavities in mechanical components (4), characterized in that said apparatus (1) comprises a supporting framework (2) supporting a working plane (3) thereon are housed the mechanical workpieces (4) to be subjected to the polishing process, said mechanical workpieces (4) being clamped to said working plane (3) by clamping means (5), said apparatus further comprising vibration generating means (6) cooperating with resilient components (7) adapted to transmit a vibration motion and amplify the action of said vibrating means (6), said apparatus (1) comprising furthermore a closed loop distributing system for distributing a mixture (8) containing a polishing and buffing cleansing material and a micro-abrading material, said mixture (8) being fed within said mechanical workpieces (4) together with metal bodies (9) having a ball shape and a different size and mass, adapted to move and stir (Continued)

said mixture (8) against the inner walls of the cavity of said mechanical workpieces (4) being processed.

6 Claims, 1 Drawing Sheet

(51) Int. Cl.
*B24B 57/04* (2006.01)
*B24B 31/00* (2006.01)

(58) Field of Classification Search
USPC ..... 451/35, 36, 61, 104, 108, 113, 326, 328, 451/329, 910
See application file for complete search history.

(56) References Cited

U.S. PATENT DOCUMENTS

| | | | | |
|---|---|---|---|---|
| 3,161,997 | A | * | 12/1964 | Balz ................. B24B 31/06 451/35 |
| 3,584,419 | A | * | 6/1971 | Hulet et al. ................. 451/113 |
| 3,680,266 | A | * | 8/1972 | Shiplov ................. B24B 31/06 366/112 |
| 4,716,684 | A | * | 1/1988 | Roach ................. 451/36 |
| 5,276,998 | A | | 1/1994 | Joen et al. |
| 5,746,691 | A | * | 5/1998 | Frantzen ................. 600/36 |
| 6,537,202 | B1 | * | 3/2003 | Frantzen ................. 600/36 |

\* cited by examiner

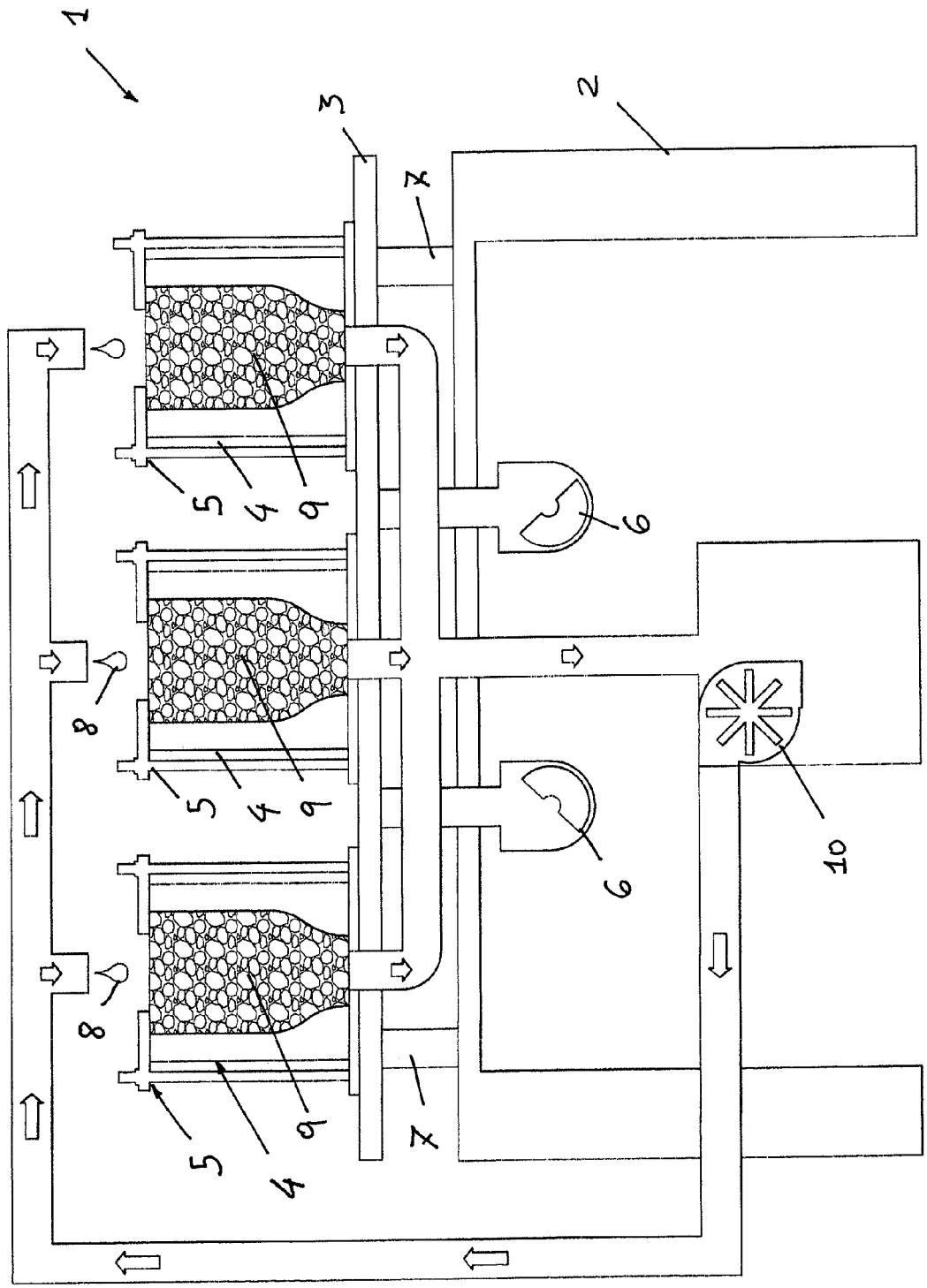

APPARATUS AND METHOD FOR POLISHING CAVITIES IN MECHANICAL COMPONENTS

BACKGROUND OF THE INVENTION

The present invention relates to an apparatus and method for polishing cavities in mechanical components.

As is known, maintenance or servicing operations are conventionally required to provide a proper performance of mechanical components or elements in mechanical machines in general and for meeting tolerance and standard quality requirements as imposed by enforcing rules.

A drawback related to the above maintenance or servicing operations performed by prior polishing or buffing systems, is that an accurate polishing or buffing operation frequently requires the use of aggressive and abrading agents, such as, for example, in manual or automatic polishing processes using grinding or polishing machines and abrading cloth arrangements.

The above mentioned operations, while providing an accurate and quick polishing, contribute to reducing the precision of joining or coupling arrangements, thereby causing a quick decay of the mechanical component performance.

Thus, it is necessary to use apparatus designed for providing a performance like that, or higher than that of a conventional maintenance equipment and, in the meanwhile, it is further necessary to reduce a quick deterioration of the processed workpieces or components.

SUMMARY OF THE INVENTION

Accordingly, the aim of the present invention is to provide such a polishing method and apparatus allowing to hold in a very high efficiency condition the processed mechanical components, to increase their useful life while reducing the operating costs.

Within the scope of the above mentioned aim, a main object of the invention is to provide an operatively flexible method and apparatus adapted to be used in several application fields for performing a perfect maintenance and servicing of mechanical components of a lot of different operating machines.

Another object of the invention is to provide such a polishing method and apparatus allowing to perfectly polish the mechanical components without using a tight or closed environment, that is an environment closed either by a closing plug or cover.

Yet another object of the present invention is to provide such a polishing method and apparatus allowing to process cavities in components made either by a metal or a non metal material.

Yet another object of the present invention is to provide such a polishing method and apparatus adapted to polish one or more components simultaneously, thereby providing a very high processing yield as well as allowing the operating life of the processed or polished components to be highly extended.

Yet another object of the present invention is to provide such a polishing method and apparatus adapted to greatly reduce wear on mechanical components owing to an elimination of highly abrading and aggressive agents as those conventionally used in prior polishing processes, thereby providing great advantages mainly for elements having complex inner geometries and shapes such as, for example, molds used for processing glass materials.

Yet another object of the present invention is to provide such a polishing method and apparatus adapted to greatly reduce operating errors and problems due to an intervention of a human operator, that is specifically designed for reducing to a minimum the need of an intervention of a human operator.

Yet another object of the present invention is to provide such a polishing method and apparatus allowing to greatly reduce the polishing cost proper, by using a very quick and accurate polishing or buffing system.

Yet another object of the present invention is to provide such a polishing apparatus which, owing to its specifically designed constructional features, is very reliable and safe in operation.

According to one aspect of the present invention, the above mentioned aim and objects, as well as yet other objects, which will become more apparent hereinafter, are achieved by an apparatus for polishing cavities in mechanical components, characterized in that said apparatus comprises a supporting framework supporting a working plane thereon are housed the mechanical workpieces to be subjected to the polishing process, said mechanical workpieces being clamped to said working plane by clamping means; said apparatus further comprising vibration generating means cooperating with resilient components adapted to transmit a vibration motion and amplify the action of said vibrating means; said apparatus comprising furthermore a closed loop distributing system for distributing a mixture containing a polishing and buffing cleansing material and a micro-abrading material, said mixture being fed within said mechanical workpieces together with metal bodies having a ball shape and a different size and mass, adapted to move and stir said mixture against the inner walls of the cavity of said mechanical workpieces being processed.

To improve the cleaning/polishing efficiency of the polishing process, the above mixture contains a high efficiency polishing liquid and a micro-abrading material, the liquid component of the fluid mixed to the micro-abrading material being fed, through a suitable loop recirculating circuit comprising pumps, to the inside of the cavities of the mechanical components and, after having performed the desired cleaning, polishing and buffing action, being caused to fall on a bottom of a plate element to be collected, through suitable holes, in an underlying tank and being brought again by a pump to recirculate to perform again the polishing operating cycle.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example, with reference to the accompanying drawing, the sole FIGURE of which schematically shows the polishing apparatus according to the present invention.

DESCRIPTION OF THE PREFERRED EMBODIMENTS

With reference to the number references of the above mentioned figures, the polishing or buffing apparatus, according to the invention, which has been generally indicated by the reference number 1, comprises a bearing framework 2, preferably made of a steel material, having a high mechanical strength, so as to resist against vibrations generated by specifically designed vibrating systems, thereby providing an efficient polishing process while preserving very high safety requirements for the apparatus operator.

Said apparatus comprises, moreover, a working supporting plane or plate 3, preferably made of a same material as that of the bearing framework, thereon the mechanical workpieces or components 4 to be subjected to the polishing or buffing process are arranged.

More specifically, a plurality of mechanical workpieces or components 4 are clamped to the supporting plate 3 by clamping flanges and studs 5.

Said apparatus comprises moreover electric power supply systems designed for generating vibrations, and including a plurality of motor driven vibrating systems 6, cooperating with resilient components 7, adapted to transmit a vibratory motion and amplify the vibrations provided by said motor driven vibrating systems.

A suitably developed and balanced mixture 8, containing a polishing and buffing cleansing material and a micro-abrading material, is simultaneously supplied to the inside of all the mechanical components 4 together with metal bodies 9, having a ball shape and different sizes and masses, adapted to drive the mixture 8 and stir it against the inner walls of the cavity of the workpiece or component 4 to be processed.

In particular the mixture 8 is distributed through a distributing circuit including a recirculation pump 10.

The polishing or buffing apparatus according to the present invention operates as follows.

The workpieces or components 4, to be subjected to a servicing polishing operation, are properly arranged on the supporting steel plate 3 in turn supported by the bearing framework 2, designed for bearing the overall weight of said plate and mechanical workpieces or components 4.

The mechanical workpiece 4 are rigidly coupled with said plate 3 by suitable restraining or clamping systems, including pairs of flanges and threaded studs 5, to provide a perfect transmission of the generated vibrations.

The vibratory motion is provided by a pair of motor driven vibrating elements 6, of a small electric power, which are supplied by electric power and are directly housed in the region underlying the plate 3.

The spring elements 7, arranged under said plate 3, in addition to providing a cushioning of the vibrations directed toward the framework 2, also amplify the vibrating effects provided by the motor driven vibrator or vibrating elements 6, in cooperation with a plurality of corresponding springs (not shown) arranged above said plate 3, to assure a proper linearity of the generated vibrations as well as an increase of the vibration frequency.

Upon arranging the mechanical workpiece 4 to be polished on the plate 3, and after having anchored said workpiece to said plate by the flange 5 locking system, a mixture holding, in difference percentages, steel balls 9 and abrading mixture is fed into the cavities of the workpiece 4.

In performing the polishing process, to amplify the combined effect of said steel balls 9 and abrading mixture, is further used in a continuous loop circuit, a fluid 8, which is driven by a dedicated electric pump 10, and is introduced by gravity from the top into the cavities of the workpieces.

Said fluid 8 advantageously comprises a polishing and cleansing solution, the effect of which is further enhanced by a given percentage or rate of a micro-abrading material.

The above system allows the mixture to hold its abrading, buffing and polishing properties constant, while reducing the processing time and greatly improving the finishing of the inner surfaces of the processed cavities.

The above disclosed apparatus has a very high polishing efficacy and efficiency.

One of the most important improvements of the inventive system is that the polishing operation is not performed inside a tight cavity, but through a loop circuit allowing a continuous recirculation of the used fluid.

Moreover, the polishing apparatus according to the present invention exploits the mechanical principles of vibrations applied to the workpieces to be processed by using a vibrating metal plate on the top surface thereof the workpieces are anchored or clamped by a flange clamping and locking system.

Thus, the generated vibrations cause the used mixture, which may contain therein steel balls, ceramics abrading materials, plastics or glass materials, silicon carbide or corindon materials, to be emulsified and stirred inside the cavities to be polished.

To further improve the cleansing/buffing efficiency of the inventive process, the mixture further contains a buffing or polishing liquid having a very high polishing efficiency, and further contains a micro-abrading material.

The liquid component of the fluid mixed with the micro-abrading material, is fed, through a suitable loop recirculating circuit comprising recirculating pumps, to the inside of the workpiece cavities and, after having provided a required cleansing, polishing and buffing action, is caused to fall on the bottom plate.

Then, through suitable depositing holes, it is collected in an underlying tank and is again taken by a pump to be again recirculated to start again its polishing operating cycle.

This specifically designed feature of the inventive machine, that is the continuous recirculating of the mixture, allows the mechanical workpieces to be polished without the need of providing a tight environment, in particular an environment closed by a closing plug or cover.

It has been found that the invention fully achieves the intended aim and objects.

In fact, the invention provides a polishing apparatus allowing to properly process cavities of mechanical workpieces or components made either of a metal or a non metal material.

The apparatus, in particular, allows to perform polishing or buffing operations either on a single or on a plurality of mechanical components simultaneously, thereby providing a very enhanced operating yield, as well as an increased useful life of the processed components.

Thus, the inventive apparatus provides a lot of operating improvement advantages.

In fact, the apparatus according to the present invention allows to greatly reduce wear on the mechanical components, owing to an elimination of highly abrading and aggressive agents as conventionally used in prior polishing methods, with a consequent great advantages in particular for elements having very complex inner geometries and shapes, such as, for example, molds used in molding glass materials which molds, as known, are very difficult to be processed and, moreover, in conventional processes are undesirably worn on their corner portions, with a serious deterioration of their performance.

Furthermore, the polishing apparatus according to the present invention allows to reduce errors and problems related to the operator intervention, since the inventive apparatus reduces to a minimum the human operations, which are necessary only for properly locating and/or removing the workpieces to be polished, and for switching the apparatus on and off.

Moreover, the polishing apparatus according to the present invention allows to greatly reduce the polishing cost since the polishing process carried out by said apparatus is very quick and accurate, the polishing operating time being included in a operating range from 2 to 10 hours, depending on the type of the components to be polished, of the used mixture and the finishing quality to be achieved.

The apparatus according to the present invention can be used in a broad range of applications, since the materials which can be polished by the inventive process may be either metal materials, such as steel or stainless steel, aluminium, bronze-aluminium materials, or hollow glass, ceramics and plastics material.

Finally, the apparatus according to the present invention allows to operate without the need of using vessels and related covers for holding therein the abrading and polishing mixture, with a consequent further reduction of the cost and size.

In practicing the invention, the used materials, as well as the contingent size and shapes, can be any, according to requirements.

The invention claimed is:

1. A workpiece polishing apparatus comprising a plurality of open top workpieces each having an open top and a cavity, a solid polishing mixture arranged in each said cavity of said plurality of open top workpieces and comprising steel balls of different size and mass and abrasive materials, a liquid polishing solution containing a polishing and buffing cleaning material and a micro-abrading material, and a closed loop distribution system adapted to pump said liquid polishing solution containing said polishing and buffing cleaning material and said micro-abrading material through said open top of each one of said plurality of open top workpieces into said solid polishing mixture arranged in said cavity of each one of said plurality of open top workpieces so as to perform polishing or buffing operations on said plurality of said open top workpieces simultaneously, said open top workpieces being made either of a metal or non metal material, said apparatus further comprising a bearing framework, a working plate arranged horizontally above said bearing framework, said working plate removably supporting thereon said plurality of said open top workpieces, a flange clamping system removably clamping said plurality of open top workpieces to said working plate, and said apparatus further comprising a vibration apparatus adapted to generate vibrations to said working plate and to said plurality of open top workpieces supported on said working plate, said apparatus further comprising resilient components adapted to transmit a vibrating motion and amplify an action of said vibrating apparatus, said resilient elements being arranged below said working plate and being directly connected between said bearing framework and said working plate, said closed loop distributing system being operated to continuously recirculate by a pump, said liquid polishing solution containing said polishing and buffing cleaning material and said micro-abrading material through said open top of each one of said open top workpieces into said solid polishing mixture arranged in said cavity of each one of said plurality of open top workpieces while said vibration apparatus is operating and generating vibrations simultaneously of said plurality of open top workpieces supported on said working plate, said plurality of open top workpieces being removably clamped to said working plate such that a bottom of each one of said plurality of open top workpieces is arranged directly above said working plate, and said closed loop distributing system being operated to continuously recirculate said liquid polishing solution which falls through depositing holes provided in said bottom of each one of said plurality of open top workpieces and in said working plate and which is collected in a tank arranged underlying said working plate and which is pumped by said pump to be recirculated through said open top of each one of said plurality of open top workpieces clamped to said working plate.

2. A workpiece polishing apparatus according to claim 1, wherein said bearing framework is made of a steel material adapted to resist against vibrations generated by said vibration apparatus and to provide an efficient polishing process and assure safety of operators, said working plate being made of the same steel material as that of said bearing framework.

3. A workpiece polishing apparatus according to claim 1, wherein said flange clamping system comprises, for each one of said plurality of open top workpieces, a pair of threaded flange and threaded stud elements.

4. A workpiece polishing apparatus according to claim 1, wherein said vibration apparatus comprises electric motor driven vibrating devices arranged in a region underlying said working plate.

5. A workpiece polishing apparatus according to claim 4, wherein said resilient components comprise first springs arranged under said working plate and operating for damping vibrations directed to said bearing framework and amplifying the vibration of said electric motor driven vibrating devices, and second springs arranged above said working plate adapted to provide linearity in said vibrations and increase a frequency thereof.

6. A workpiece polishing apparatus according to claim 1, wherein said closed loop distribution system comprises a loop circuit including at least said pump which is an electric pump.

\* \* \* \* \*